(12) United States Patent
Feve et al.

(10) Patent No.: US 7,880,961 B1
(45) Date of Patent: Feb. 1, 2011

(54) OPTICAL AMPLIFIER EXHIBITING NET PHASE-MISMATCH SELECTED TO AT LEAST PARTIALLY REDUCE GAIN-INDUCED PHASE-MATCHING DURING OPERATION AND METHOD OF OPERATION

(75) Inventors: Jean-Philippe Feve, Cupertino, CA (US); Dahv A. V. Kliner, San Ramon, CA (US); Roger L. Farrow, Pleasanton, CA (US)

(73) Assignee: Sandia Corporation, Livermore, CA (US)

( * ) Notice: Subject to any disclaimer, the term of this patent is extended or adjusted under 35 U.S.C. 154(b) by 601 days.

(21) Appl. No.: 11/800,383

(22) Filed: May 4, 2007

Related U.S. Application Data

(60) Provisional application No. 60/839,539, filed on Aug. 22, 2006.

(51) Int. Cl.
 *H01S 3/00* (2006.01)
(52) U.S. Cl. ................................ 359/341.1; 385/123
(58) Field of Classification Search ............... 385/123; 398/43; 359/341.1
 See application file for complete search history.

(56) References Cited

U.S. PATENT DOCUMENTS

| 7,038,842 | B2 | 5/2006 | Griseri et al. | |
| 7,155,095 | B2* | 12/2006 | Aso et al. | 385/123 |
| 2006/0082869 | A1 | 4/2006 | Uda et al. | |
| 2006/0291036 | A1* | 12/2006 | Shukunami et al. | 359/333 |
| 2009/0128892 | A1* | 5/2009 | Wise et al. | 359/341.1 |

OTHER PUBLICATIONS

Paul E. Schrader, Roger L. Farrow, Dahv A.V. Kliner, Jean-Phillippe Feve and Nicholas Landru, Fiber Based Laser with Tunable Repetition Rate, Fixed Pulse Duration, and Multiple Wavelength Output, Fiber Lasers IV: Technology, Systems, and Applications, 2007, 64530D-1-9, vol. 6453.

Paul E. Schrader, Roger L. Farrow, Dahv A.V. Kliner, Jean-Phillippe Feve and Nicholas Landru, High-power fiber amplifier with widely tunable repetition rate, fixed pulse duration, and multiple output wavelengths, Optics Express, Nov. 27, 2006, 11528-11538, vol. 14, No. 24.

Jean-Philippe Feve, Paul E. Schdrader, Roger L. Farrow & Dahv A.V. Kliner, Four-wave mixing in nanosecond pulsed fiber amplifiers, Optics Express, Apr. 16, 2007, 4647-4662, vol. 15, No. 8.

Jean-Philippe Feve, Phase-matching and mitigation of four-wave mixing in fibers with positive gain, Optics Express, 577, Jan. 27, 2007, 577-582, vol. 15, No. 2.

\* cited by examiner

*Primary Examiner*—Mark Hellner
(74) *Attorney, Agent, or Firm*—Workman Nydegger

(57) ABSTRACT

An optical amplifier, such as an optical waveguide amplifier (e.g., an optical fiber amplifier or a planar waveguide) or a non-guiding optical amplifier, that exhibits a net phase-mismatch selected to at least partially reduce gain-induced phase-matching during operation thereof is disclosed. In one aspect of the invention, an optical amplifier structure includes at least one optical amplifier having a length and a gain region. The at least one optical amplifier exhibits a net phase-mismatch that varies along at least part of the length thereof selected to at least partially reduce gain-induced phase-matching during operation thereof.

42 Claims, 5 Drawing Sheets

US 7,880,961 B1

OPTICAL AMPLIFIER EXHIBITING NET PHASE-MISMATCH SELECTED TO AT LEAST PARTIALLY REDUCE GAIN-INDUCED PHASE-MATCHING DURING OPERATION AND METHOD OF OPERATION

CROSS-REFERENCE TO RELATED APPLICATION

This application claims the benefit of U.S. Provisional Application No. 60/839,539, filed on Aug. 22, 2006, the disclosure of which is incorporated herein by reference.

STATEMENT REGARDING RESEARCH & DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

This invention relates to optical amplifiers, such as optical fiber amplifiers. More particularly, this invention relates to an optical amplifier exhibiting a net phase-mismatch selected to at least partially reduce gain-induced phase-matching during operation thereof.

BACKGROUND

Pulsed optical fiber amplifiers have recently gained considerable interest in applications, such as material processing, printing, and light detection and ranging because of their capability to reliably produce nanosecond pulses with high average and peak power, and good beam quality. Recent developments in double clad ytterbium doped large mode area ("LMA") optical fiber amplifiers have led to record combination of average and peak output powers at 1064 nm. Due to the very high peak intensities of the amplified pulses in such optical fiber amplifiers, nonlinear effects (e.g., stimulated Brillouin scattering ("SBS") and stimulated Raman scattering ("SRS") can limit the extracted pulse energy.

One prior art technique for reducing nonlinear effects is to increase the effective mode area of the optical fiber by decreasing the core numerical aperture and increasing the core diameter thereof. Recently, photonic crystal or "holey" fibers have been used to increase the mode area of an optical fiber. However, the viability of increasing the effective mode area of single mode LMA optical fibers can be limited due to the increased sensitivity to bend-losses when the effective mode area is increased, which can limit the manufacturability or practical utility of such optical fibers and can cause even the lowest order transverse mode to leak out.

A variety of prior art techniques are available that can assist with maintaining single-transverse mode output in multi-mode optical fibers. Such techniques include selective bend-losses in coiled optical fibers, control of the seed conditions, design of radial index and dopant profiles, and use of helical-core optical fibers. However, the desire for larger output powers leads to operation of these pulsed optical fiber amplifiers at the maximum peak power for the given optical fiber core dimensions so that nonlinear effects can remain an issue. Limiting effects on the output power, spectral bandwidth, or temporal profile depend on the temporal regime. SBS is one of the most limiting factors for long pulses (>~10 nanosecond) and self-phase modulation induces very large distortion of the temporal profile and spectra for short pulses (<1 nanosecond). Accordingly, one prior art approach shows that a pulse duration of approximately 1 nanosecond is suitable for minimizing the above-mentioned nonlinear effects in high energy pulsed optical fiber amplifiers. When a pulse duration of 1 nanosecond is used, SRS generally becomes the most limiting effect.

Another nonlinear effect in pulsed optical fiber amplifiers is four-wave mixing (FWM), which can lead to a relatively broad output spectrum in a pulsed optical fiber amplifier. FWM in an optical fiber amplifier results when two waves from the amplified beam combine to produce so-called "signal" and "idler" waves in which the signal wave has a wavelength greater than the wavelength of the amplified wave and the idler wave has a wavelength less than the wavelength of the amplified wave. FWM is efficient when the four interacting fields remain phase-matched as they propagate along the length of the optical fiber. However, in single-mode isotropic optical fibers with normal dispersion, which is usually the case of optical fiber amplifiers, the extent of phase-matching is very limited so that FWM remains a very weak effect.

As will be described more fully below, the inventors have found that FWM can significantly limit the output power in pulsed optical fiber amplifiers. Accordingly, there is still a need in the art for increasing the output power in optical amplifiers such as pulsed optical fiber amplifiers while taking into account the limiting effect of FWM.

SUMMARY

An optical amplifier, such as an optical waveguide amplifier (e.g., an optical fiber amplifier or a planar waveguide) or a non-guiding optical amplifier, which exhibits a net phase-mismatch selected to at least partially reduce gain-induced phase-matching during operation thereof is disclosed. In one aspect of the invention, an optical amplifier structure includes at least one optical amplifier having a length and a gain region. The at least one optical amplifier exhibits a net phase-mismatch that varies in a controlled manner along at least part of the length thereof selected to at least partially reduce gain-induced phase-matching during operation thereof. Various embodiments are disclosed for controlling the net phase-mismatch by altering the modal dispersion, material dispersion, nonlinear phase-mismatch, or combinations thereof of the at least one optical amplifier.

In another aspect of the invention, a method for reducing gain-induced phase-matching in an optical amplifier is disclosed. The method includes providing the optical amplifier with a controlled net phase-mismatch that varies along at least part of the length thereof and at least partially reducing gain-induced phase-matching in the optical amplifier during operation thereof as a result of the variation in the net phase-mismatch.

DETAILED DESCRIPTION OF VARIOUS EMBODIMENTS

Figure 1:
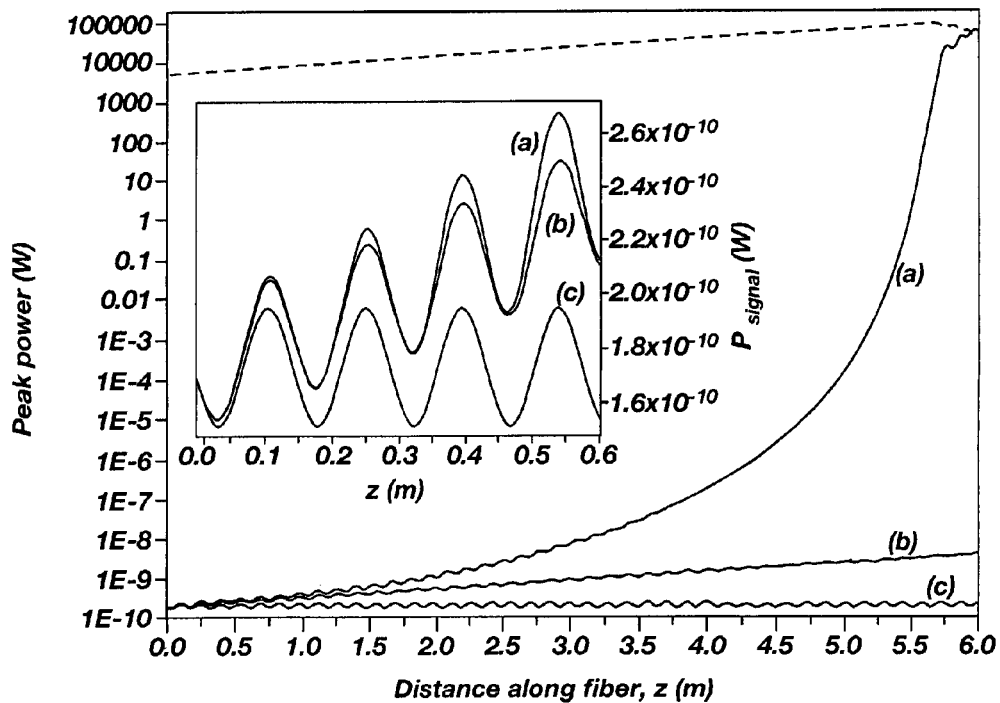
FIG. 1 is a graph illustrating the phenomenon of gain-induced phase-matching in an optical fiber amplifier in which the power of the FWM signal field can approach the magnitude of the amplified field power output from the optical fiber amplifier.

Various embodiments of the invention are directed to an optical amplifier structure, such as an optical waveguide amplifier (e.g., an optical fiber amplifier or a planar waveguide) or a non-guiding optical amplifier, which exhibits a selected net phase-mismatch that at least partially reduces "gain-induced phase-matching" during operation thereof. Gain-induced phase-matching is physical phenomenon that can result in limiting the output power and distorting the temporal profile and spectrum of the output pulse therefrom. Before discussing the various embodiments of the invention for at least partially reducing or substantially eliminating gain-induced phase-matching during operation of an optical amplifier, a brief mathematical model and explanation below illustrates how the presence of positive gain in an optical amplifier causes the gain-induced phase-matching of the FWM signal field and, consequently, limits the output power in an optical amplifier.

Gain-Induced Phase-Matching In Optical Amplifiers

The inventors have discovered the phenomenon of gain induced phase-matching of FWM in optical amplifiers, which can limit the output power of the amplified signal. While the mathematical model below is described using an optical fiber amplifier, the model is applicable to any optical amplifier including non-guiding optical amplifiers and optical waveguide amplifiers, such as optical fiber amplifiers. In a single transverse mode passive optical structure such as a passive optical fiber, in the regime of normal dispersion, the signal and idler fields generated in the FWM process merely oscillate as they propagate along the length of the passive optical structure and, thus, do not constructively interfere with each other because the phase-matching condition cannot be achieved. However, in an optical amplifier with positive gain, the power of the FWM signal field grows as the FWM signal field propagates along the length of an optical amplifier and the power of the FWM signal field may approach the same order of magnitude as the amplified field power even for nominally non-phase-matched FWM. Consequently, this gain-induced phase matching of the FWM signal waves may limit the output power of an optical amplifier and may also temporally distort the output pulse and broaden the output spectrum.

Nonlinear coupled differential equations for the complex electric field of the amplified wave in an optical fiber amplifier and the FWM signal and idler waves generated by FWM may be represented as follows:

$$\begin{cases} \frac{\partial e_1}{\partial z} = j\gamma[|E_1|^2 + (2-\rho)(|E_3|^2 + |E_4|^2)]E_1 - \frac{g_R}{2A_{eff}}|E_3|^2 E_1 + \\ \quad j\gamma E_1^* E_3 e^{j\Delta kz} \\ \frac{\partial E_3}{\partial z} = j\gamma[|E_3|^2 + (2-\rho)(|E_1|^2 + |E_4|^2)]E_3 + \frac{g_R}{A_{eff}}|E_1|^2 E_3 + \\ \quad j\gamma E_4^* E_1 E_1 e^{-j\Delta kz} \\ \frac{\partial E_4}{\partial z} = j\gamma[|E_4|^2 + (2-\rho)(|E_1|^2 + |E_3|^2)]E_4 + j\gamma E_3^* E_1 E_1 e^{-j\Delta kz} \end{cases} \quad (1)$$

with the complex electric field $E_i(z)=A_i(z)\, e^{j\Phi(z)}$ related to power by $P_i(z)=A_i^2(z)$. The indices 1, 3, and 4 represent, respectively, the amplified field, FWM signal field, and FWM idler field in the optical fiber amplifier. All fields are assumed to propagate in the fundamental fiber mode. The terms in the right-hand side of Equations (1) describe, respectively, self- and cross-phase-modulation, SRS, amplification gain, and FWM. $g_R$ is the Raman gain and $\rho$ is the fractional Raman contribution (typically $\rho=0.18$ in silica fibers), and the nonlinear coefficient is $\gamma=n_2\omega_l/cA_{eff}$ where $n_2$ is the nonlinear index of refraction of the optical fiber amplifier, $\omega_l$ is the frequency of the amplified field, c is the speed of light, and $A_{eff}$ is the effective mode area of the fundamental mode of the optical fiber amplifier. $\Delta k$ is the phase-mismatch between the amplified field, idler field, and signal field propagating in the optical fiber amplifier. $\Delta k$ is proportional to $n_3/\lambda_3+n_4/\lambda_4-2n_1/\lambda_1$, where $n_i$, $n_3$, and $n_4$ are the effective index of refraction of the modes of the amplified field, idler field, and signal field. Analytical solutions of Equation (1) may be obtained if non-depletion of the pump field during FWM ($E_{3,4} \ll E_1$) is assumed. The first equation of the set of Equations (1) is solved to yield:

$$E_1(z) = \sqrt{P_0}\exp\left(\frac{g}{2}z\right)\exp\left(j\frac{\gamma P_0}{g}e^{gz}\right) \quad (2)$$

where $P_0$ is the peak power of the input signal into the optical fiber amplifier to be amplified.

The equations for the FWM signal and idler fields are transformed by setting $B_3=E_3\exp(-j2\gamma P_0 e^{gz}/g)$. The net phase-mismatch and the signal field obey:

$$\kappa(z) = \Delta k z + 2\frac{\gamma P_0}{g}e^{gz} \quad (3)$$

$$\frac{d^2 B_3}{dz^2} + [j(\Delta k + 2\gamma P_0 e^{gz}) - g]\frac{dB_3}{dz} - \gamma^2 P_0^2 e^{2gz} B_3 = 0 \quad (4)$$

The presence of the gain factor g then leads to a significant difference of the power of the FWM signal field compared to the power of the FWM signal field in a passive optical fiber without gain. In a passive optical fiber, the net phase-mismatch exhibits a linear variation along the length in the optical fiber, while in an optical amplifier with positive gain, the net phase-mismatch is nonlinear.

The net phase-mismatch, $\kappa(z)$, is a physical property of an optical material such as an optical fiber. Three physical phenomenon generally contribute to $\kappa(z)$: material dispersion (i.e., the wavelength dependence of the index of refraction of the optical amplifier), modal dispersion when the optical amplifier is configured as an optical waveguide amplifier (i.e., for a given mode propagating in the optical amplifier, the effective index of refraction of the optical amplifier depends on wavelength), and nonlinear phase-mismatch which depends on the intensity of the amplified field, signal field, and idler field. The phase-mismatch, $\Delta k$, is a function of the material and modal dispersion of the optical fiber amplifier, and the nonlinear phase-mismatch component $(2\gamma P_0 e^{gz}/z)$ of the net phase-mismatch is a function of the nonlinear coefficient and the gain of the optical fiber amplifier.

The electric field for the signal field may also be solved using known analytical methods. The generated power for the FWM signal field in an optical fiber amplifier may be expressed as:

$$P_3(z) = [A\exp(u_+ z) + B\exp(u_- z)]^2 \quad (5)$$

$u_\pm$ take simple forms in the limits of large and small $\Delta k$, detailed below. Constants A and B depend on the input power at the different wavelengths at the optical fiber amplifier entrance.

In the limit of no gain (g=0), or if $\Delta k \gg 2\gamma P_0 e^{gz}$, the above relations reduce to the following equation for the generated power for the signal wave:

$$P_3(z) \propto \sin^2\left(\frac{\Delta k z}{2}\right) \quad (6)$$

Equation 6 represents the typical evolution of the FWM signal field in the case of non-phase-matched interaction in an optical fiber without gain (i.e., a passive optical fiber). The power of the FWM signal field merely oscillates, with the period being the coherence length of the interaction, and the FWM signal field is not efficiently constructed as it propagates along the length of the optical fiber.

When $\Delta k \ll 2\gamma P_0 e^{gz}$, with the additional assumption $g \ll 2\gamma P_0 e^{gz}$ for all z, which is the case of a typical optical fiber amplifier with positive gain, Equation (5) may be approximated by:

$$P_3(z) \propto \exp(gz) \quad (7)$$

A characteristic length for the above described phenomenon of gain-induced phase-matching in an optical amplifier may be represented as follows:

$$L_{PM} = \frac{1}{g}\ln\left(\frac{\Delta k}{2\gamma P_0}\right) = \frac{1}{g}\ln\left(\frac{\Delta k \lambda_1 A_{eff}}{4\pi n_2 P_0}\right) \quad (8)$$

If the optical fiber amplifier length (L) is $\ll L_{PM}$, gain has no noticeable impact on phase-matching. In contrast, if L is $\gg L_{PM}$, gain has a significant effect on FWM and, consequently, the power of the FWM signal wave.

FIG. 1 shows the generated power for the amplified field and the power for the FWM signal field as calculated using Equation (1) for an optical fiber amplifier made from a silica fiber with an $A_{eff}$=500 μm² (core diameter ~30 μm), $n_2$=2.7× $10^{-20}$ m²/W, g=0.5 m⁻¹ (20 dB over 9.2 m, assuming simple exponential gain), input signal pulses $P_0$ at 1064 nm of 5 μJ and 1 nanosecond duration at full width half maximum. FIG. 1 also shows the power for the FWM signal field for a passive optical fiber with no gain calculated using Equation (1). As can be appreciated from examining FIG. 1, the generation of significant power of the FWM signal field in an optical fiber amplifier is due to the presence of positive gain. Because the net mismatch, $\kappa(z)$, varies nonlinearly with the distance z along the length of the optical fiber amplifier, the FWM signal field is progressively constructed as it propagates along the length of the optical fiber amplifier, even with non-zero net phase-mismatch in single-mode isotropic fibers with normal dispersion. The FWM signal power due to gain-induced phase-matching represented as the solid line (a) approaches the power of the amplified field (shown as a dotted line) as the FWM signal field propagates along the length of the optical fiber amplifier. FIG. 1 also shows that for a passive optical fiber (i.e., g=0) represented by the solid line (b) and for a passive optical fiber with neither gain nor Raman gain represented by the solid line (c), the signal field is not constructed as it propagates along the length of the optical fiber amplifier.

Figure 2:
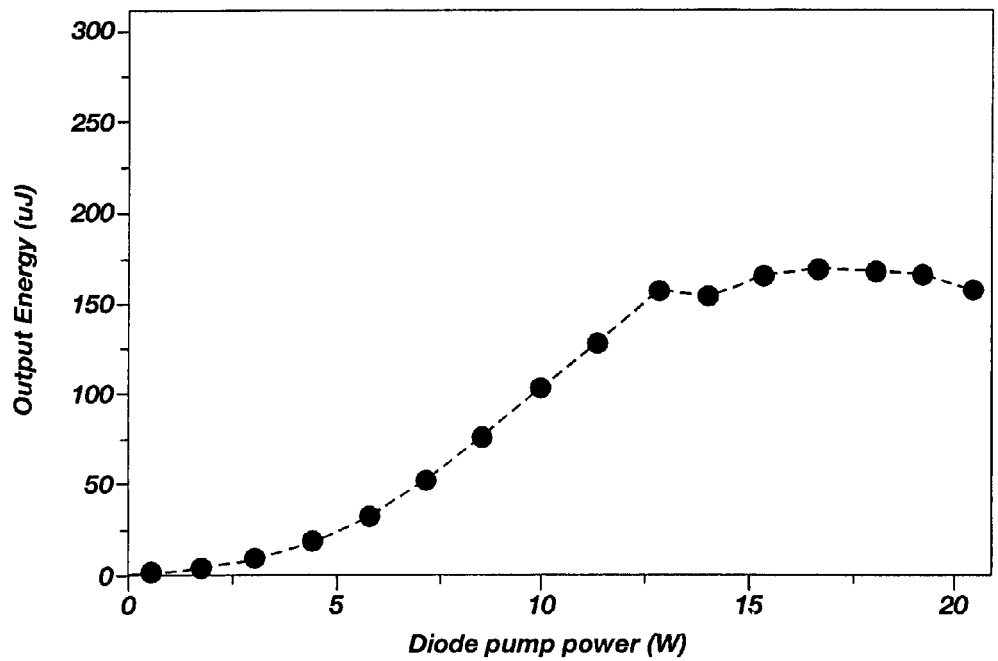
FIG. 2 is a graph illustrating how gain-induced phase-matching can cause saturation of the output energy of the amplified field from an optical fiber amplifier.

Accordingly, the effect of gain-induced phase-matching can significantly impact the output power of an optical amplifier, such as an optical fiber amplifier. As further shown by the experimental data in FIG. 2 for an optical fiber amplifier, the output energy of the amplified field saturates due to the gain-induced phase-matching caused by the positive gain in the optical fiber amplifier. As the laser diode pump power used to excite the gain medium in the optical fiber amplifier is increased, the output energy of the amplified field eventually saturates so that any further increases in the laser diode pump power results in the generation of the unwanted FWM signal and idler fields and not of the amplified field.

DETAILED DESCRIPTION OF OPTICAL AMPLIFIER EMBODIMENTS OF THE INVENTION

Many specific details of embodiments are set forth below in the following description and figures in order to provide a thorough understanding of such embodiments. One skilled in the art, however, will understand that the invention may have additional embodiments, or that the invention may be practiced without several of the details described in the following description. In the figures like elements and features are identified by like reference numerals.

Figure 3:
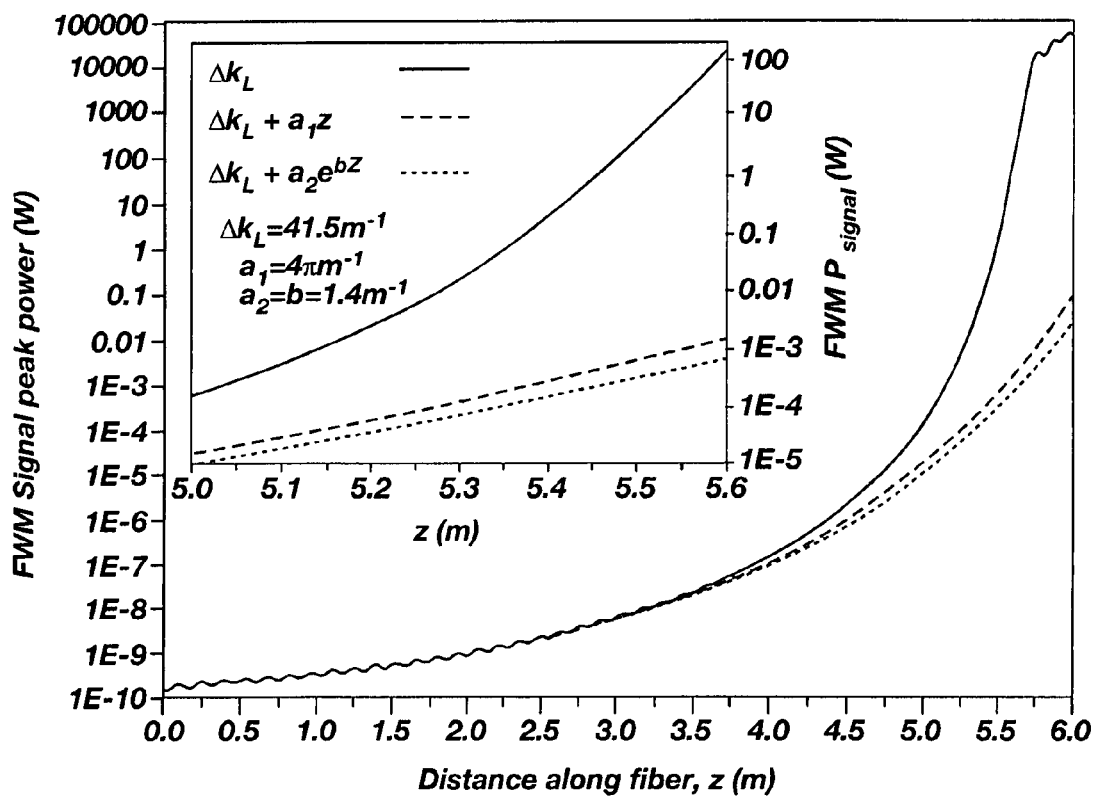
FIG. 3 shows a graph of the FWM signal power when an optical fiber amplifier has a linear and an exponentially varying net phase-mismatch introduced to it that is selected to at least partially reduce the power of gain-induced phase-matching in accordance with various embodiments of the invention.

Various embodiments of the invention include optical amplifiers such as optical waveguide amplifiers (e.g., an optical fiber amplifier or a planar waveguide) or non-guiding optical amplifiers exhibiting a selected net phase-mismatch that at least partially reduces gain-induced phase-matching during operation thereof by introducing a controlled longitudinal variation in the net phase-mismatch. Introducing a longitudinally varying net phase-mismatch along at least part of the length of an optical amplifier may at least partially reduce the effects of gain-induced phase-matching when the variation in net phase-mismatch is properly selected. When a longitudinally varying phase-mismatch $f(z)$ is imposed on the optical amplifier where z is the longitudinal coordinate of the optical amplifier, the effective phase mismatch of the optical amplifier is given by $\Delta_{eff}=\Delta k+f(z)$. Consequently, if the function $f(z)$ is selected so that:

$$\Delta k+f(z)>>2\gamma P_0 e^{gz} \quad (9),$$

the power of the FWM signal field may be described by a relation similar to Equation (6), and FWM signal field is not efficiently constructed as it propagates along the length of the optical amplifier. FIG. 3 shows a graph of the FWM signal power when a linear and an exponentially varying phase-mismatch are introduced to an optical fiber amplifier selected so that $\Delta k+f(z)>>2\gamma P_0 e^{gz}$). However, it should be understood, that other variations in the phase mismatch may be used such as, for example, a polynomial variation or a step variation in the phase mismatch. As shown in FIG. 3, a longitudinally varying phase-mismatch and, consequently, a longitudinally varying net phase-mismatch results in a substantial decrease in the power of the FWM signal field generated due to FWM. Additionally, introducing a longitudinally varying gain ($g=g(z)$), nonlinear coefficient ($\gamma=\gamma(z)$), or both may also result in a substantial decrease in the power of the FWM signal field generated due to FWM.

FIGS. 4 through 11 show various embodiments of the invention for generating a longitudinal variation in the net phase-mismatch of an optical amplifier that is selected to at least partially reduce gain-induced phase-matching during operation thereof. The net phase-mismatch of the optical amplifier may be longitudinally varied by altering the material dispersion, modal dispersion, nonlinear phase-mismatch, or combinations thereof of the optical amplifier. With reference to Equation (3), the net phase-mismatch may be altered by varying $\Delta k$ along the length of the optical amplifier, which is a function of the material dispersion of the optical amplifier and if the optical amplifier is a waveguide, the modal dispersion of the optical amplifier. Longitudinally varying the nonlinear coefficient, gain, or both of the optical amplifier varies the nonlinear phase-mismatch component ($2\gamma P_0 e^{gz}$) of the net phase-mismatch.

Figure 4:
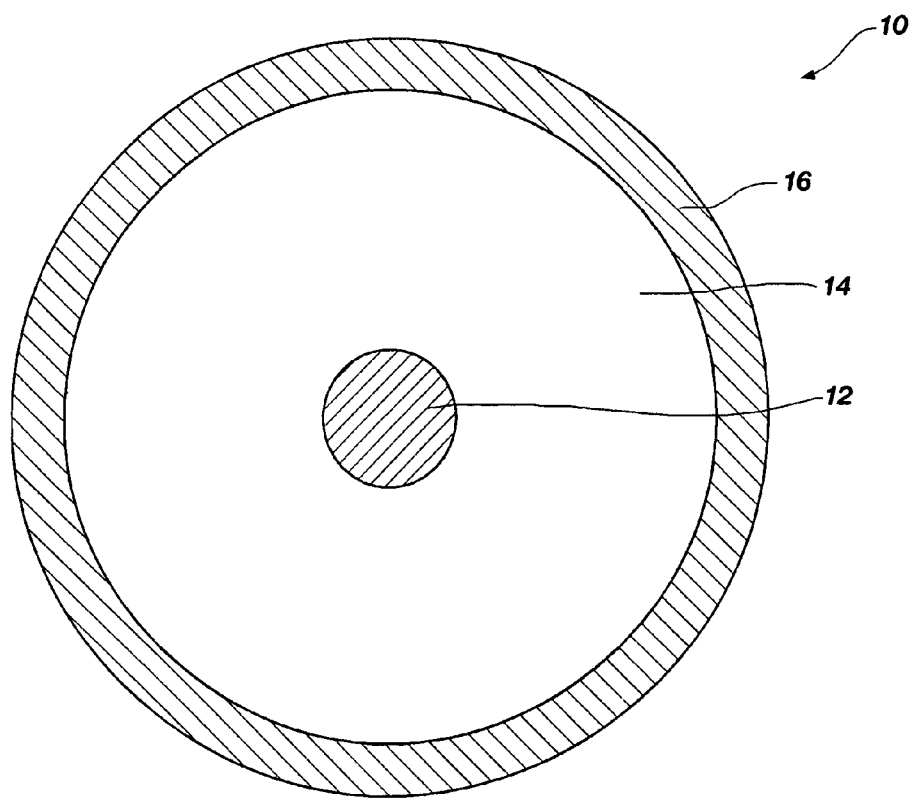
FIG. 4 is schematic transverse cross-sectional view of an optical amplifier depicted as a double clad optical fiber amplifier structure in accordance with one embodiment of the invention.
Figure 5:
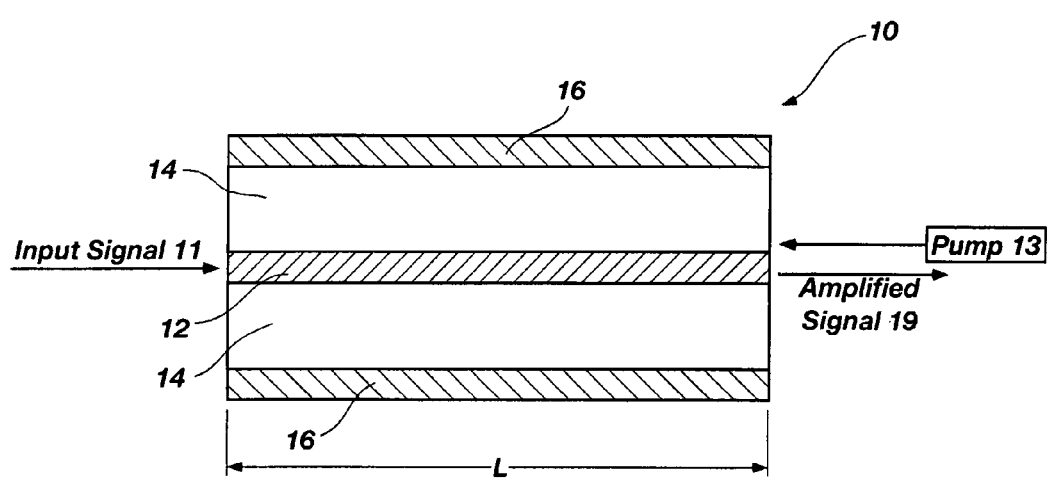
FIG. 5 is schematic longitudinal cross-sectional view of the optical fiber amplifier shown in FIG. 4.

FIGS. 4 and 5 illustrate one embodiment of an optical amplifier depicted as an optical fiber amplifier 10. The optical fiber amplifier 10 has a selected net phase-mismatch that at least partially reduces gain-induced phase-matching during operation thereof. The optical fiber amplifier 10 has a length L and a core/gain region 12 that is doped with a sufficient amount of at least one active element, such as a rare earth element. Suitable rare earth elements for doping the glass material include neodymium, erbium, and ytterbium. The optical fiber amplifier 10 further includes an inner cladding 14 that generally surrounds the core 12 and an outer cladding 16 that generally surrounds the inner cladding 14. The optical fiber amplifier 10 may exhibit a variety of different refractive index profiles such as, for example, a step-index profile or graded index profile. As known in the art, the inner cladding 14 has an index of refraction less than the index of refraction of the core region 12, and the outer cladding 16 has an index of refraction less than the index of refraction of the inner cladding 14.

It should be emphasized, that although the optical fiber amplifier 10 is illustrated as a double clad optical fiber amplifier, in other embodiments, the optical fiber amplifier 10 may be a single clad optical fiber or any optical fiber amplifier or optical fiber laser that has a gain region. In fact, the techniques disclosed herein for introducing a selected amount of net phase-mismatch to an optical amplifier are not limited to the type of optical amplifier configuration and are applicable to any currently available or subsequently developed optical amplifier such as an optical waveguide amplifier, optical fiber amplifier, optical fiber laser or other optical amplifier in bulk or fiber form that has positive gain. For example, the optical amplifiers disclosed herein may also be formed in substrates using micro-fabrication processing or another suitable type of fabrication technique.

Referring to FIG. 5, in operation, an input signal 11 to be amplified enters one end of the optical fiber amplifier 10. The input signal 11 enters the core/gain region 12 of the optical fiber amplifier 10. Light output from a pump 13, which may be a laser diode or another suitable light source, is also coupled into one end of the optical fiber amplifier 10, which excites the active elements within the core/gain region 12. As the input signal 11, which is at approximately the same energy as the excited active elements, passes through the core/gain region 12, the input signal 11 stimulates emission from the excited active elements. The power of the input signal 11 progressively increases as it propagates through the core/gain region 12 to effect amplification of the input signal 11 represented as amplified signal 19 being output from one end of the optical fiber amplifier 10. According to the above discussion, gain-induced phase-matching will cause FWM to generate signal and idler waves that will be output with the amplified field. However, the gain-induced phase-matching due to the presence of the gain region 12 is at least partially reduced when a selected longitudinally varying net phase-mismatch is introduced to the optical fiber amplifier 10.

Figure 6A:
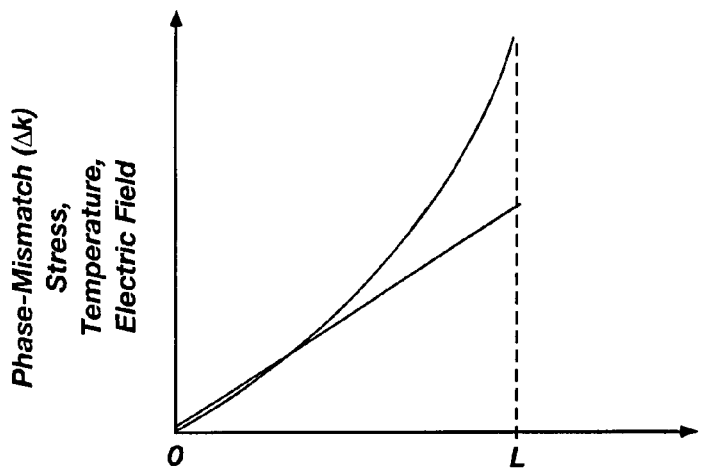
FIG. 6A is a graph illustrating different techniques for generating the longitudinal variation in net phase-mismatch in the optical fiber amplifier structure of FIG. 4 in accordance with various embodiments of the invention.
Figure 6B:
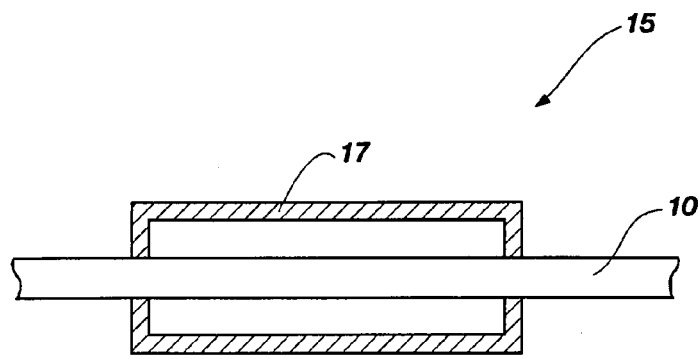
FIG. 6B is schematic cross-sectional view an optical fiber amplifier structure including a device operable to apply an external stress, temperature, or electric field gradient along at least part of or a substantial portion of the length L of the optical fiber amplifier in accordance with one embodiment of the invention.

FIG. 6A shows various embodiments of the invention for introducing a longitudinally varying net phase-mismatch to the optical fiber amplifier 10. The net phase-mismatch may be introduced to the optical fiber amplifier 10 by application of a stress, temperature, and/or electric field gradient along at least part of or a substantial portion of the length L of the optical fiber amplifier 10 that varies the material and/or modal dispersion of the optical fiber amplifier 10 and, consequently, the phase-mismatch ($\Delta k$) and net phase-mismatch for the optical fiber amplifier 10. As shown in FIG. 6A, the stress, temperature, and/or electric field gradient may be a linear, exponential, or any other suitably selected variation in stress, temperature, and/or electric field that at least partially reduces gain-induced phase-matching during operation of the optical fiber amplifier 10. In such an embodiment, as shown in FIG. 6B, an optical fiber amplifier structure 15 may include a device 17 situated on or near the optical fiber amplifier 10 that is operable to apply the external stress, temperature, and/or electric field gradient along at least part of or a substantial portion of the length L of the optical fiber amplifier 10. Examples of devices 17 include, but are not limited to, suitably configured resistance heating elements, a tensioning device configured to apply a longitudinally varying stress field, or an electric field generator configured to generate an electric field that varies longitudinally along the length L of the optical fiber amplifier 10.

Figure 7:
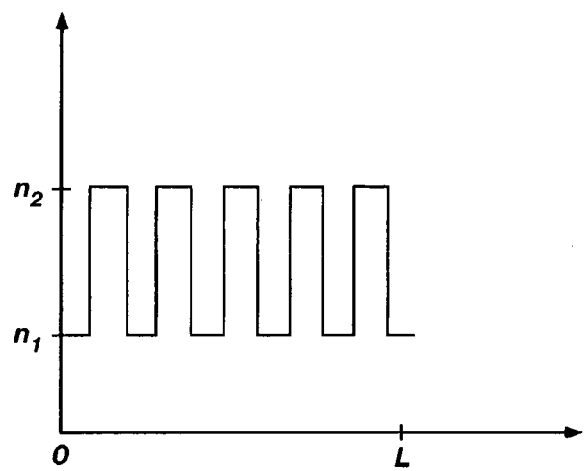
FIG. 7 is graph of an index of refraction profile along the length of an optical fiber amplifier in accordance with one embodiment of the invention.

FIG. 7 shows another embodiment of the invention for introducing a longitudinally varying net phase-mismatch by altering the material dispersion of the optical fiber amplifier 10. In the embodiment of FIG. 7, the optical fiber amplifier 10 exhibits a longitudinally varying index of refraction profile that varies along at least part of or a substantial portion of the length L of the optical fiber amplifier 10. The index of refraction of the optical fiber amplifier 10 may be varied by exposing the optical fiber amplifier 10 to ultraviolet light having an intensity that is selectively modulated along the length L of the optical fiber amplifier 10. However, the index of refraction profile does not need to be periodic as shown in FIG. 7. In another embodiment, the index of refraction profile may be non-periodic and still impart a selected net phase-mismatch to the optical fiber amplifier 10. In still another embodiment, the optical fiber amplifier 10 may be a photonic crystal fiber, otherwise known as a holey fiber, in which the cladding includes a plurality of holes having sizes or pitch that vary along at least part of the length L of the optical fiber amplifier 10 to impart a selected net phase-mismatch to the optical fiber amplifier 10.

Figure 8:
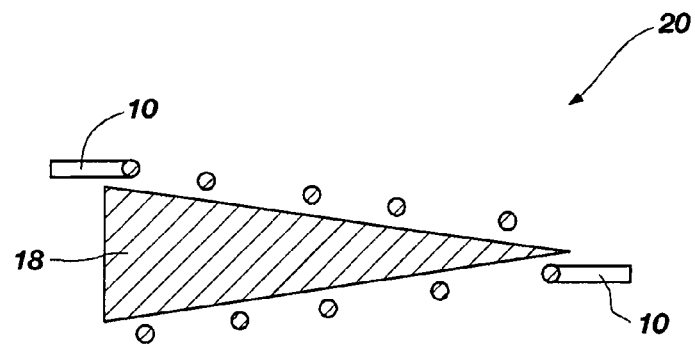
FIG. 8 is a schematic cross-sectional view of an optical fiber amplifier structure having an optical fiber amplifier coiled about generally conically shaped mandrel in accordance with one embodiment of the invention.

FIG. 8 shows another embodiment of the invention for introducing a longitudinally varying net phase-mismatch to the optical fiber amplifier 10. An optical fiber amplifier structure 20 includes a generally conically shaped mandrel 18 having the optical fiber amplifier 10 coiled thereabout with a continuously varying bend radius. The continuously varying bend radius of the optical fiber amplifier 10 provides a correspondingly varying bend-induced stress, birefringence, and/or transverse mode profile to the optical fiber amplifier 10 along the length L thereof that varies primarily the modal dispersion of the optical fiber amplifier 10 and, consequently, the phase-mismatch and net phase-mismatch of the optical fiber amplifier 10. As a result of the varying bend-induced stress, birefringence, and/or transverse mode profile, the net phase-mismatch varies along the length L of the optical fiber amplifier 10 to at least partially reduce gain-induced phase-matching during operation of the optical fiber amplifier 10.

Figure 9:
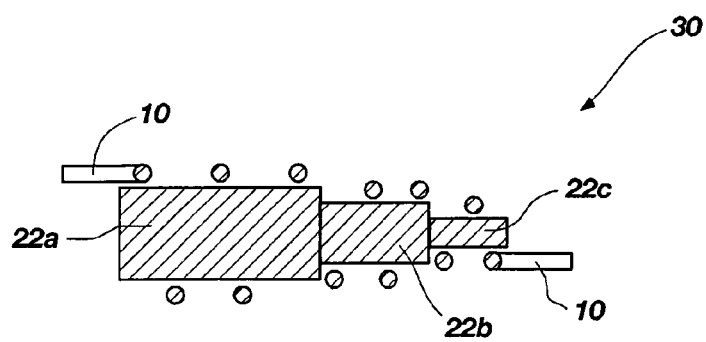
FIG. 9 is a schematic cross-sectional view an optical fiber amplifier structure having an optical fiber amplifier coiled about a generally cylindrically shaped mandrel portions so that the bend radius of the optical fiber amplifier varies in discrete segments along its length in accordance with one embodiment of the invention.

FIG. 9 shows yet another embodiment of the invention for introducing a longitudinally varying net phase-mismatch to the optical fiber amplifier 10. An optical fiber amplifier structure 30 includes a generally cylindrically shaped mandrel 22 having a first portion 22a with a first diameter, a second portion 22b with a second diameter less than the first diameter, and a third portion 22c with a third diameter less than the first diameter. The optical fiber amplifier 10 is coiled about the first, second, and third portions 22a, 22b, and 22c of the mandrel 22. In a manner similar to the optical fiber amplifier structure 20, varying the bend radius of the optical fiber amplifier 10 by coiling it around the first, second, and third portions 22a, 22b, and 22c each of which has a different diameter that varies the bend-induced stress, birefringence, and/or transverse mode profile at each of the first, second, and third portions 22a, 22b, and 22c. This primarily alters the modal dispersion of the optical fiber amplifier 10 and, consequently, produces a variation in the phase-mismatch and net phase-mismatch along the length L of the optical fiber amplifier 10 to at least partially reduce gain-induced phase-matching during operation of the optical fiber amplifier 10.

Figure 10:
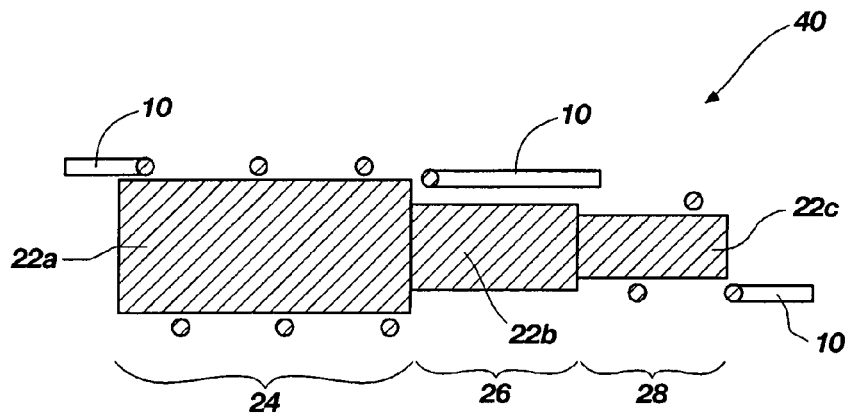
FIG. 10 is a schematic cross-sectional view an optical fiber amplifier structure having an optical fiber amplifier coiled about a generally cylindrically shaped mandrel portions to exhibit a generally straight or uncoiled portion that extends between coiled portions of the optical fiber amplifier in accordance with one embodiment of the invention.

FIG. 10 shows yet another embodiment of the invention for introducing a longitudinally varying net phase-mismatch to the optical fiber amplifier 10. An optical fiber amplifier structure 40 includes the mandrel 22. However, the optical fiber amplifier 10 is coiled around the first and second portions 22a and 22c to define coiled portions 24 and 28, respectively, with a generally un-coiled or generally straight portion 26 that extends between the coiled portions 24 and 28. Such a coiled configuration for the optical fiber amplifier 10 also provides a net phase-mismatch that varies along the length L of the optical fiber 10 to at least partially reduce gain-induced phase-matching during operation of the optical fiber amplifier 10. In another embodiment, the above configuration of an un-coiled portion 26 between coiled portions 24 and 28 may be repeated along the length L of the optical fiber amplifier 10.

In additional embodiments, the geometry of the optical fiber amplifier 10 may be tailored to provide a longitudinally varying modal dispersion in the optical fiber amplifier 10, consequently, producing a longitudinally varying net phase-mismatch. For example, with reference to FIGS. 4 and 5, the diameter of the core/gain region 12 may continuously taper along at least part of or all of the optical fiber amplifier 10. Such a configuration will also at least partially reduce gain-induced phase-matching during operation of the optical fiber amplifier 10.

Figure 11:
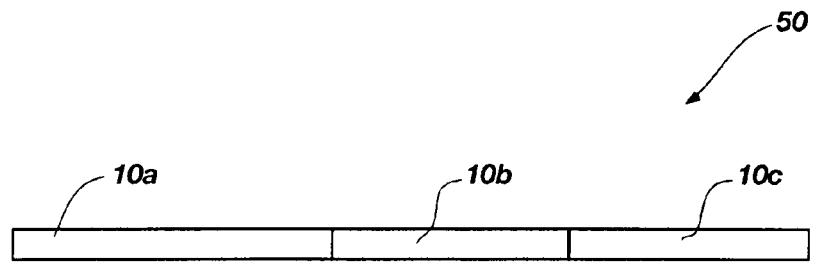
FIG. 11 is a schematic view another embodiment of the invention in which an optical fiber amplifier structure includes a plurality of optical fiber amplifiers that are spliced together, at least some of the optical fiber amplifiers exhibiting different core indices of refraction.

FIG. 11 shows yet another embodiment of the invention for introducing a longitudinally varying net phase-mismatch to an optical fiber amplifier structure. As shown in FIG. 11, an optical fiber amplifier structure 50 fabricated by splicing a plurality of optical fiber amplifiers 10a-10n together using a fusion splicing process. At least some or all of the optical fiber amplifiers 10a-10n exhibit different effective indices of refractions for their respective core/gain regions 12 to at least partially reduce gain-induced phase-matching during operation of the optical fiber amplifier 10. In this embodiment, the material dispersion and/or modal dispersion of the optical fiber amplifier structure 50 is altered, consequently, producing a longitudinally varying effective index of refraction for the optical fiber amplifier structure 50.

As previously discussed, the net phase-mismatch of the optical fiber amplifier 10, as expressed by Equation (3), may also be varied along the length L thereof by varying the nonlinear phase-mismatch component of the net phase-mismatch. The nonlinear phase-mismatch may be longitudinally varied by longitudinally varying the gain and/or the nonlinear coefficient of the optical fiber amplifier in order to satisfy Equation (9) and, thus, reduce gain-induced phase-matching during operation of the optical fiber amplifier 10. For example, the gain of the optical fiber amplifier 10 may be longitudinally varied by varying the concentration of the active elements (e.g., ytterbium) longitudinally within the core/gain region 12 of the optical fiber amplifier 10. In another embodiment, the inner cladding 14 geometry, such as the area of the inner cladding 14 (FIGS. 4 and 5), may be longitudinally varied in order to control the absorption of the light output by the pump 13 (FIG. 5). In yet another embodiment, light output by the pump 13 (FIG. 5) may be input into the optical fiber amplifier 10 at multiple locations (e.g., by side-pumping) spaced apart along the length L thereof in order to induce a longitudinal variation of the amplified field, which will result in a longitudinal variation of the nonlinear phase-mismatch. In yet another embodiment, an optical fiber amplifier structure may be fabricated by splicing a plurality of optical fiber amplifiers together (FIG. 11), where at least some or all of the optical fiber amplifiers exhibit different nonlinear indices of refractions for their respective core/gain regions 12. This will also introduce a longitudinal variation of the nonlinear phase-mismatch to the collective optical fiber amplifier structure formed of the multiple optical fiber amplifiers that at least partially reduces gain-induced phase-matching during operation thereof.

In additional embodiments, one or more of the aforementioned embodiments for altering the material dispersion, modal dispersion, and nonlinear phase-mismatch components of the net phase-mismatch may be combined, as desired, to controllably vary the net phase-mismatch of the optical fiber amplifier 10 along its length L to at least partially reduce gain-induced phase-matching during operation of the optical fiber amplifier 10.

Additionally, the various techniques for introducing a controlled longitudinally varying net phase-mismatch to an optical fiber amplifier for at least partially reducing gain-induced phase-matching may also be employed in optical fiber lasers. In such an embodiment, selectively reflective elements may be provided at the opposing ends of the optical fiber amplifier 10 to define an optical cavity. At one end of the optical fiber amplifier 10, a first mirror or Bragg grating that transmits light from an excitation source and reflects light at the wavelength characteristic of core/gain region 12 is provided and a second mirror or Bragg grating that transmit light at the wavelength characteristic of core/gain region 12 and reflects light emitted from the excitation source is provided.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An optical amplifier structure, comprising:
   at least one optical amplifier including a length and a gain region;
   wherein the at least one optical amplifier exhibits a net phase-mismatch that varies along at least part of the length thereof selected to at least partially reduce gain-induced phase-matching during operation thereof, the net phase-mismatch being controlled by longitudinally varying at least one of material dispersion, modal dispersion, or nonlinear phase-mismatch of the at least one optical amplifier.

2. The optical amplifier structure of claim 1 wherein the at least one optical amplifier is configured as an optical waveguide amplifier.

3. The optical amplifier structure of claim 1 wherein the at least one optical amplifier is configured as an optical fiber amplifier.

4. The optical amplifier structure of claim 1 wherein the at least one optical amplifier is configured as an optical fiber laser.

5. The optical amplifier structure of claim 1 wherein the net phase-mismatch is controlled by varying the modal dispersion of the at least one optical amplifier along the at least part of the length thereof.

6. The optical amplifier structure of claim 1 wherein the net phase-mismatch is controlled by coiling at least a portion of the at least one optical amplifier.

7. The optical amplifier structure of claim 6 wherein:
   the at least one optical amplifier is configured as an optical fiber amplifier; and
   the at least a portion of the optical fiber amplifier is coiled with a bend radius that varies along the at least part of the length thereof.

8. The optical amplifier structure of claim 6 wherein:
   the at least one optical amplifier is configured as an optical fiber amplifier; and
   the at least a portion of the optical fiber amplifier comprises a first portion that is coiled with a first bend radius and a second portion that is coiled with a second bend radius that is not equal to the first bend radius.

9. The optical amplifier structure of claim 6 wherein:
   the at least one optical amplifier is configured as an optical fiber amplifier; and
   the at least a portion of the optical fiber amplifier comprises a first coiled portion, a second coiled portion, and an uncoiled portion therebetween.

10. The optical amplifier structure of claim 1 wherein the at least one optical amplifier is structured to provide the net phase-mismatch that varies along the at least part of the length thereof.

11. The optical amplifier structure of claim 10 wherein the at least one optical amplifier comprises a core having a lateral dimension that varies along the at least part of the length thereof.

12. The optical amplifier structure of claim 1 wherein the at least one optical amplifier is configured as a holey fiber.

13. The optical amplifier structure of claim 1 wherein the net phase mismatch is provided by a stress field that varies along the at least part of the length of the at least one optical amplifier.

14. The optical amplifier structure of claim 1 wherein the net phase-mismatch is controlled by varying the material dispersion of the at least one optical amplifier along the at least part of the length thereof.

15. The optical amplifier structure of claim 1 wherein the net phase-mismatch is provided by a temperature gradient along the at least part of the length of the at least one optical amplifier.

16. The optical amplifier structure of claim 1 wherein the at least one optical amplifier comprises a plurality of optical fiber amplifiers that are spliced together, each of the plurality of optical fiber amplifiers having a core region that exhibits different respective indices of refractions.

17. The optical amplifier structure of claim 1 wherein the at least one optical amplifier comprises a transverse refractive index profile that varies along the at least part of the length of the at least one optical amplifier to control the net phase-mismatch.

18. The optical amplifier structure of claim 1 wherein the at least one optical amplifier comprises at least one Bragg grating configured to provide the net phase-mismatch that varies along the at least part of the length thereof.

19. The optical amplifier structure of claim 1, further comprising a device operable to apply one of a stress field, a temperature gradient, or an electric field that varies along the at least part of the length of the at least one optical amplifier to control the net phase-mismatch.

20. The optical amplifier structure of claim 1 wherein the net phase-mismatch substantially reduces gain-induced phase-matching during operation of the at least one optical amplifier.

21. The optical amplifier structure of claim 1 wherein the net phase-mismatch is controlled by varying the nonlinear phase mismatch of the at least one optical amplifier along the at least part of the length thereof.

22. The optical amplifier structure of claim 21 wherein the nonlinear phase mismatch is varied by longitudinally varying the concentration of active elements present in the gain region of the at least one optical amplifier.

23. The optical amplifier structure of claim 21 wherein the nonlinear phase mismatch is varied by longitudinally varying the nonlinear index of refraction of the at least one optical amplifier.

24. The optical amplifier structure of claim 21 wherein:
the at least one optical amplifier is configured as an optical fiber amplifier that comprises an inner cladding disposed between a core including the gain region and an outer cladding; and
the nonlinear phase mismatch is varied by longitudinally varying the geometry of the inner cladding.

25. The optical amplifier structure of claim 21 wherein the at least one optical amplifier comprises a plurality of optical fiber amplifiers that are spliced together, each of the plurality of optical fiber amplifiers having a core region that exhibit different respective nonlinear indices of refractions.

26. The optical amplifier structure of claim 21 wherein the at least one optical amplifier is configured to allow light output from a pump for exciting the gain region to be input at multiple locations along the length of the at least one optical amplifier.

27. The optical amplifier structure of claim 1 wherein the net phase-mismatch is present in the at least one optical amplifier when the at least one optical amplifier is not in operation.

28. A method for reducing gain-induced phase-matching in an optical amplifier having a length, comprising:
varying at least one of material dispersion, modal dispersion, or nonlinear phase-mismatch of the optical amplifier so that the net phase-mismatch varies along at least part of the length; and
at least partially reducing gain-induced phase-matching in the optical amplifier during operation thereof as a result of the variation in the net phase-mismatch.

29. The method of claim 28 wherein the act of varying at least one of material dispersion, modal dispersion, or nonlinear phase-mismatch of the optical amplifier so that the net phase-mismatch varies along at least part of the length varying the modal dispersion of the optical amplifier along the at least part of the length thereof.

30. The method of claim 28 wherein:
the optical amplifier is configured as an optical fiber amplifier; and
the act of varying at least one of material dispersion, modal dispersion, or nonlinear phase-mismatch of the optical amplifier so that the net phase-mismatch varies along at least part of the length comprises coiling the optical fiber amplifier to exhibit a non-uniform bend radius along the at least part of the length thereof.

31. The method of claim 28 wherein:
the optical amplifier is configured as an optical fiber amplifier; and
the act of varying at least one of material dispersion, modal dispersion, or nonlinear phase-mismatch of the optical amplifier so that the net phase-mismatch varies along at least part of the length coiling discrete portions of the optical fiber amplifier to exhibit different respective bend radii.

32. The method of claim 28 wherein the act of varying at least one of material dispersion, modal dispersion, or nonlinear phase-mismatch of the optical amplifier so that the net phase-mismatch varies along at least part of the length providing a core to the optical amplifier that has a lateral dimension that varies along the at least part of the length thereof.

33. The method of claim 28 wherein the act of varying at least one of material dispersion, modal dispersion, or nonlinear phase-mismatch of the optical amplifier so that the net phase-mismatch varies along at least part of the length varying the material dispersion of the optical amplifier along the at least part of the length thereof.

34. The method of claim 28 wherein the act of varying at least one of material dispersion, modal dispersion, or nonlinear phase-mismatch of the optical amplifier so that the net phase-mismatch varies along at least part of the length comprises applying a stress to the optical amplifier that varies along the at least part of the length thereof.

35. The method of claim 28 wherein the act of varying at least one of material dispersion, modal dispersion, or nonlinear phase-mismatch of the optical amplifier so that the net phase-mismatch varies along at least part of the length applying a temperature gradient along the at least part of the length of the optical amplifier.

36. The method of claim 28 wherein the act of varying at least one of material dispersion, modal dispersion, or nonlinear phase-mismatch of the optical amplifier so that the net phase-mismatch varies along at least part of the length applying an electric field that varies along the at least part of the length of the optical amplifier.

37. The method of claim 28 wherein the act of providing the optical amplifier with a net phase-mismatch that varies along at least part of the length thereof varying at least one of material dispersion, modal dispersion, or nonlinear phase-mismatch of the optical amplifier so that the net phase-mismatch varies along at least part of the length splicing a plurality of optical fiber amplifiers together, each of the optical fiber amplifiers having different respective core index of refractions.

38. The method of claim 28 wherein the act of varying at least one of material dispersion, modal dispersion, or nonlinear phase-mismatch of the optical amplifier so that the net phase-mismatch varies along at least part of the length comprises exposing the optical amplifier to ultraviolet light to impart a selected variation in the index of refraction of the optical amplifier.

39. The method of claim 28 wherein the act of varying at least one of material dispersion, modal dispersion, or nonlinear phase-mismatch of the optical amplifier so that the net phase-mismatch varies along at least part of the length varying the nonlinear phase-mismatch of the optical amplifier along the at least part of the length thereof.

40. The method of claim 28 wherein the optical amplifier is configured as an optical waveguide amplifier.

41. The method of claim 28 wherein the optical amplifier is configured as an optical fiber amplifier.

42. The method of claim 28 wherein the optical amplifier is configured as an optical fiber laser.

* * * * *